(No Model.)

T. WEIR.
WHEEL FOR VELOCIPEDES.

No. 460,243. Patented Sept. 29, 1891.

WITNESSES:
Edward C. Hammond
Frederick G. Ball

INVENTOR:
Thomas Weir
By his Attorney.

UNITED STATES PATENT OFFICE.

THOMAS WEIR, OF DUBLIN, IRELAND.

WHEEL FOR VELOCIPEDES.

SPECIFICATION forming part of Letters Patent No. 460,243, dated September 29, 1891.

Application filed February 16, 1891. Serial No. 381,693. (No model.) Patented in England November 30, 1889, No. 19,237.

*To all whom it may concern:*

Be it known that I, THOMAS WEIR, a subject of the Queen of Great Britain, residing at Dublin, in the county of Dublin, Ireland, have invented certain new and useful Improvements in Wheels for Velocipedes and other Carriages, (for which I have obtained Letters Patent in Great Britain numbered 19,237, bearing date November 30, 1889,) of which the following is a specification.

My invention relates to an improved construction of wheels for velocipedes and other road-vehicles; and it consists in the use of two rims of unequal diameters connected together by a hollow rubber tire, forming both an elastic tire for the wheel and also an elastic suspensory connection between the two rims, the inner one of which is adapted to receive the spokes of the wheel and the other one to form the working or bearing rim and to carry the elastic tire, the object being to obtain a wheel the center part of which is suspended from that part diametrically opposite to the part in contact with the ground and in which the elasticity of the whole, or at least the greater part of the elastic tire, is at all times operative. I attain this end in the manner illustrated in the accompanying drawings, in which—

Figure 1:
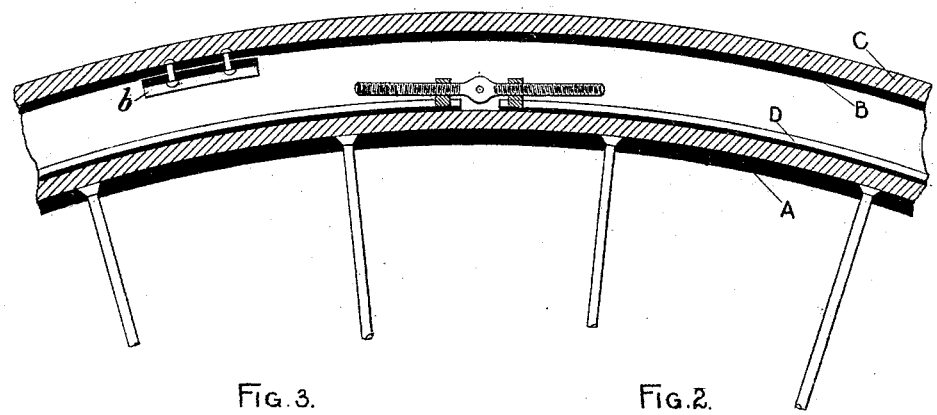
Figure 2:
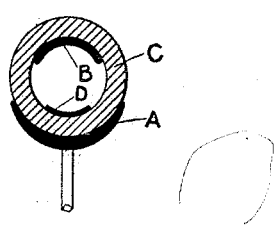

Figure 1 is a view, in sectional elevation, of part of a wheel constructed according to my invention; and Fig. 2 is a view in cross-section thereof. Figs. 3, 4, 5, 6, and 7 are views in cross-section showing various other forms my invention may assume.

Throughout these views similar parts are marked with like letters of reference.

Figure 3:
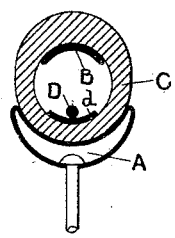
Figure 4:
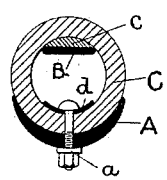
Figure 7:
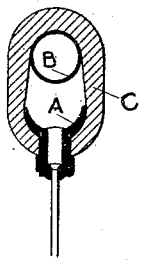
Figure 6:
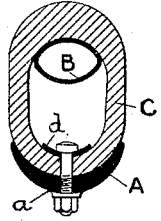
Figure 5:
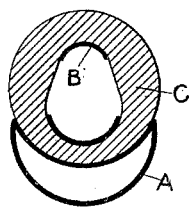

The wheel is constructed with a rim A, of a crescent or other suitable section, which may be either solid or hollow. Outside this, at a suitable distance therefrom, is a second or outer rim B, which is made solid or hollow and of an inverted crescent or other suitable section. Over this outer rim B is passed an india-rubber tube C, adapted to form the elastic tire of the wheel. This tube is made of any desired thickness, and is preferably thicker at the part intended to be the tread of the wheel, as shown by Figs. 3, 5, 6, and 7 of the accompanying drawings. It is essential that this hollow tire shall be made of pure or approximately pure rubber, and that it has no lining or thickening piece of canvas or other non-elastic material. The outer rim B may bear directly against the outer interior surface of the hollow rubber tire C, as shown by Figs. 1, 2, 3, 5, 6, and 7 of the accompanying drawings, or indirectly through a lining of hard rubber or other suitable substance c, as shown by Fig. 4 of the accompanying drawings, the shape of the lining-piece c being adapted to suit the section of the outer rim B. The hollow elastic tire C is attached to the inner or main rim A of the wheel, and the desired amount of tension is obtained on the sides of the said tire by any of the devices already well known for fixing tires to the rims of wheels—for instance, by an internal wire or band D, the ends of which are adapted to be drawn together and fixed as illustrated by Figs. 1, 2, and 5 of the accompanying drawings, or by a combination of an internal wire D and series of segments d, adapted to distribute the pressure of the binding-wire over the inner surface of the hollow tire C in contact with the rim A and prevent it being cut by the said wire, as illustrated by Fig. 3 of the accompanying drawings, or the segments d may be drawn down and attached to the rim A by means of small bolts a, as illustrated by Figs. 4 and 6 of the accompanying drawings; or, as a further modification, the inner or main rim A may be placed inside the hollow rubber tire C, as shown by Fig. 7 of the accompanying drawings, the spokes of the wheel being attached to nipples in the said rim. The amount of tension put on the sides of the hollow rubber tire C depends on the resiliency required or the weight the wheel has to carry, having regard to the thickness of the walls of the said hollow tire, the amount of tension being regulated by the relative sizes of the inner and outer rims A and B, and the tension may be put on the sides or walls of the said hollow tire either by drawing it down into the inner rim by means of the internal binder or binders or by expanding the outer rim or contracting the inner rim by a right and left hand screw or its equivalent. The outer rim B is joined up after it is passed through the hollow tire C by riveting or screwing on a small plate b, as shown by Fig. 1 of the accompanying drawings, or by any other convenient device. After the ends of the rim or rims or binder have been fastened the abutting ends of the hollow rubber tire are preferably cemented together.

I do not bind myself to the use of any particular metal or material or combination thereof for the construction of the outer rim B, the internal binder D, or segments d, as any suitable metal or material or combination thereof may be used.

I wish it to be particularly understood that I do not limit myself to the precise details of construction herein set forth and illustrated by the accompanying drawings, but hold myself at liberty to make such changes and alterations as fairly fall within the spirit and scope of my invention.

I am aware that prior to the date of my invention wheels have been made with two concentric rims having rubber cushions interposed between them, and I am also aware that prior to the date of my invention springs have been used in hollow rubber tires to increase their elasticity, and I therefore do not broadly claim such as my invention; but, Having now particularly described and ascertained the nature of my said invention and in what manner the same is to be performed, I declare that what I claim is—

1. The combination, with a tubular tire of elastic material, of two rims or hoops of different diameters arranged within the tire and means, such as a screw, for regulating the relative diameters of the two rims and thereby causing the two rims to hold the sides of the tire in a state of permanent tension, substantially as set forth.

2. The combination, with a tubular tire of elastic material, of two rims or hoops of different diameters arranged within the tire and means, such as a screw, for contracting the smaller of the two rims and thereby holding the sides of the tire in a state of permanent tension, substantially as set forth.

In witness whereof I have hereunto signed my name in the presence of two subscribing witnesses.

THOMAS WEIR.

Witnesses:
 JAMES WEIR,
 MINNIE DOWNEY.